(12) United States Patent
Kaneko et al.

(10) Patent No.: US 6,903,858 B2
(45) Date of Patent: Jun. 7, 2005

(54) OPTICAL SCANNING DEVICE WITH AIR CURRENT RECTIFYING MECHANISM

(75) Inventors: Koji Kaneko, Ageo (JP); Tasuku Hosonuma, Saitama (JP)

(73) Assignee: Fujinon Corporation, Saitama (JP)

( * ) Notice: Subject to any disclaimer, the term of this patent is extended or adjusted under 35 U.S.C. 154(b) by 138 days.

(21) Appl. No.: 10/383,074

(22) Filed: Mar. 7, 2003

(65) Prior Publication Data

US 2003/0184836 A1 Oct. 2, 2003

(30) Foreign Application Priority Data

Mar. 29, 2002 (JP) ........................................ 2002-094049

(51) Int. Cl.[7] .............................................. G02B 26/08
(52) U.S. Cl. ...................................... 359/217; 359/507
(58) Field of Search ................................ 359/196, 197, 359/216–219, 507, 509

(56) References Cited

U.S. PATENT DOCUMENTS

| | | | | |
|---|---|---|---|---|
| 4,691,998 A | * | 9/1987 | Sakagaito et al. | ........... 359/855 |
| 5,625,482 A | * | 4/1997 | Sugiura | ...................... 359/216 |
| 6,327,067 B2 | * | 12/2001 | Koguchi | ...................... 359/198 |

FOREIGN PATENT DOCUMENTS

| | | |
|---|---|---|
| JP | 7-199106 | 8/1995 |
| JP | 08240780 | * 9/1996 |
| JP | 9-197328 | 7/1997 |

* cited by examiner

*Primary Examiner*—Mark A. Robinson
*Assistant Examiner*—Alessandro Amari
(74) *Attorney, Agent, or Firm*—Arnold International; Bruce Y. Arnold

(57) ABSTRACT

An optical scanning device is disclosed that includes a rotary polygon mirror and an air current rectifying mechanism. The air current rectifying mechanism is positioned with a surface that is substantially parallel to an end surface of the rotary polygon mirror. At least one specified condition is satisfied to insure that negative pressure regions are prevented from forming on planar surfaces of the rotary scanning mirror when the scanning mirror is rotated by a scanning motor. In this manner, dust that normally tends to be deposited on the scanner mirror planar surfaces by eddy currents that form as a result of these negative pressure regions is prevented from adhering to the rotary scanning mirror surfaces. Thus, optical performance of the scanning mirror is maintained over time.

10 Claims, 5 Drawing Sheets

OPTICAL SCANNING DEVICE WITH AIR CURRENT RECTIFYING MECHANISM

BACKGROUND OF THE INVENTION

The general principle of operation of an optical scanning device will first be described with reference to prior art FIG. 10. A beam L from a laser 1 passes through a cylindrical lens 2 which condenses the laser beam into a line that is incident onto planar reflecting surfaces formed on a rotary polygon mirror 3. The rotary polygon is generally a regular polygon shape and rotates, for example, in the direction indicated by the arrow R so as to repeatedly scan, by reflection, a light beam that passes through an imaging lens system 4a, 4b so as to illuminate an object 5 that is to be scanned.

In such an optical scanning device, as shown in FIG. 11(a), air currents shown by the arrow A, are generated due to the rotation of the polygon mirror 3 in the rotation direction R. There tends, however, to be a low pressure region just after the intersection of the planar reflecting surfaces 3a. This is because air that is flowing relative to one planar reflecting surface 3a due to the rotation tends to separate from the next adjacent planar reflecting surface 3a, causing a low pressure region immediately following the intersections of the planar reflecting surfaces 3a at the polygon corners 3b. This negative pressure forms eddy currents $A_2$ within the region W of each planar reflecting surface 3a. Dust carried by the air currents $A_1$ and $A_2$ tends to be deposited onto, and to adhere to, the reflecting plane 3a, which in time causes a cloudy region D to form on the mirror surfaces, as shown in FIG. 11(b). The adhering dust mainly concentrates near the center in the axial direction, as shown in FIG. 11(b), which is an active region in terms of the reflecting surfaces 3a acting to scan the incident laser beam by reflection. Therefore, when dust adheres to the region D, the reflectivity of the mirror surface 3a is markedly reduced in the region D, which results in a lowering of the quality of output of the optical scanning device.

Accordingly, a technique wherein the concentrated adherence of dust is prevented by providing protrusions which lead the air currents outside the reflecting surfaces around a rotary polygon mirror is disclosed in Japanese Laid-Open Patent Application H9-197328. Moreover, a technique wherein the above dust-adhering eddy region is sent to a region not used for scanning a light beam, and the light beam is incident only onto regions which are free from dust adherence is disclosed in Japanese Laid-Open Patent Application H7-199106.

In the techniques described in the above publications, the arrangement of protrusions complicates the construction, and the existence of protrusions causes disorder in the air currents around the rotary polygon mirror. In the case of the rotary polygon mirror disclosed in Japanese Laid-Open Patent Application H9-197328, the disorder in the air currents is even a source of noise. Since the adhered dust narrows the effective reflection region of the mirror surfaces, a larger-scale rotary polygon mirror may be used to counteract this problem. However, this increases the size and weight of the optical scanning device, which is undesirable.

BRIEF SUMMARY OF THE INVENTION

The present invention provides an optical scanning device which effectively suppresses the adherence of dust on a reflecting surface of a rotary polygon mirror using a simple construction. In this manner the narrowing of the effective reflective regions on the mirror surfaces, and the resulting reduction in intensity of the scanned light beam, is avoided.

The present invention provides a rotary polygon mirror that scans, by reflection, a light beam emitted from a light source and includes an air current rectifying mechanism which is positioned near at least one end surface of the rotary polygon mirror. The air current rectifying mechanism is oriented so as to be substantially parallel to the at least one end surface of the rotary polygon mirror and is not rotated when the optical scanning device is used to scan a light beam.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an optical scanning device which scans a light beam from, for example, a laser, using a rotary polygon mirror. Such devices are commonly used, for example, in image-reading devices and image-writing devices. An example of the latter is a high speed laser printer.

Figure 2:
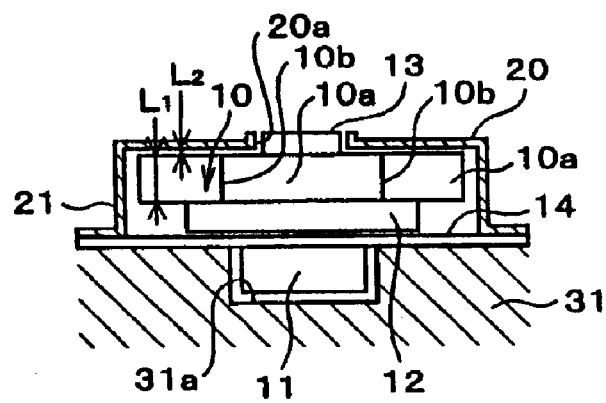
FIG. 2 is a side, sectional view of a section that has been cut along the lines 11—11 of FIG. 1.
Figure 3:
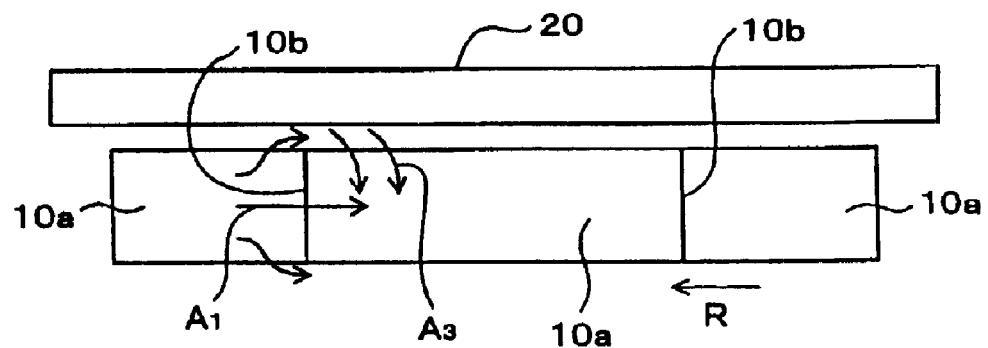
FIG. 3 is a side view which illustrates the effect of an air current rectifying mechanism in conjunction with the optical scanning device according to Embodiment 1.

The present invention adds an air current rectifying mechanism, such as the mechanism 20 shown in FIG. 2, that is positioned about the rotary axis of a rotary polygon mirror 10, for the purpose of suppressing air currents that would otherwise cause dust to adhere to portions of the planar reflecting surfaces of the rotary scanning mirror. Referring to FIG. 3, if air currents $A_1$, that are generated by a rotary polygon mirror being rotated, pass over an edge 10b where two of the planar reflecting surfaces 10a, 10a of the rotary polygon mirror 10 intersect, such air currents will collide with air currents $A_3$ that are due to a surface of the air current rectifying mechanism 20 being in close proximity to the rotary polygon mirror. This raises the air pressure on the upstream side of the planar reflecting surfaces 10a and suppresses the occurrence of eddy currents such as $A_2$ shown in FIG. 11(a). As a result, less dust that is carried by the air currents becomes adhered to the planar reflecting surfaces of the rotary polygon mirror.

Figure 11A:
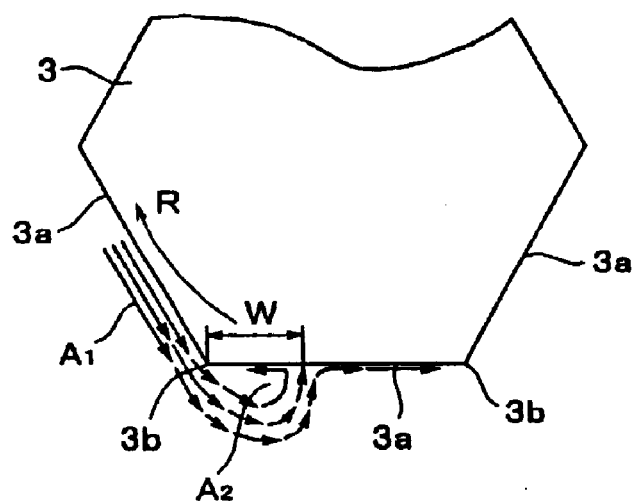
FIGS. 11(a) and 11(b) are plan and side views, respectively, for illustrating the manner in which dust adheres to surface regions of reflecting planes of prior art rotary polygon mirrors.
Figure 11B:
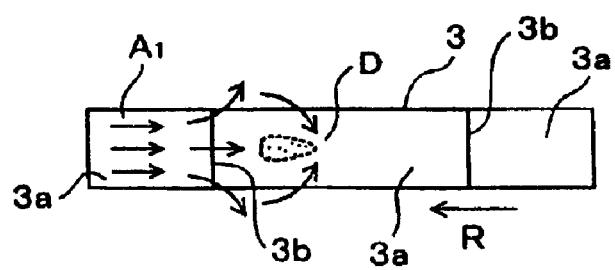

The effect of suppressing dust adherence is markedly obtained using the air current rectifying mechanism 20 to reflect the air currents $A_3$ back onto the rotary polygon mirror in a reliable manner so that a pressure is maintained in the region W illustrated in FIG. 11(a). In this manner, the low pressure that normally creates the eddy currents which tend to deposit dust onto the surface of the mirror in the area D as shown in FIG. 11(b) is avoided.

In the present invention, the following Condition (1) is satisfied:

$$L1 > L2 \qquad \text{Condition (1)}$$

where

L1 is the thickness of the rotary polygon mirror as measured in the axial direction, and L2, is the spacing, as measured in the direction of the axis of rotation of the rotary polygon mirror, between an end surface of the rotary polygon mirror and an adjacent surface of the air current rectifying mechanism.

In addition, it preferred that the following Condition (2) is also satisfied:

$$L1/2 > L2 \qquad \text{Condition (2)}$$

where L1 and L2 are as defined above.

It is also desirable that the air current rectifying mechanism have a surface that is adjacent the rotary polygon mirror that is greater in area than that of a circle that circumscribes the rotary polygon mirror.

Moreover, it is desirable that the air current rectifying mechanism be integrally formed as part of a housing for the rotary polygon mirror. This simplifies the construction by reducing the number of component parts, since the air current rectifying mechanism then need not be a separate part.

Several embodiments of the present invention will now be described in detail with reference to the drawings.

Embodiment 1

Figure 1:
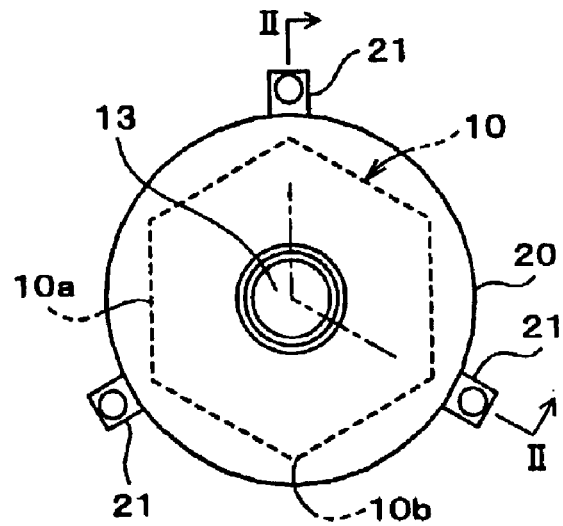
FIG. 1 is a plan view of the optical scanning device with an air current rectifying mechanism according to Embodiment 1.
Figure 10:
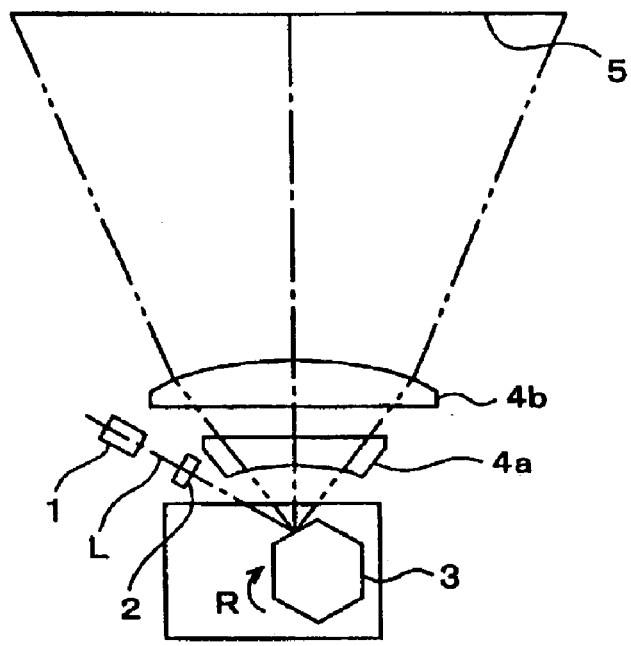
FIG. 10 is a diagram for illustrating the operation of an optical scanning device of the prior art as well as of the present invention.

FIG. 1 is a plan view of the optical scanning device according to Embodiment 1 of the present invention, and is applicable for use in the optical scanning system shown in FIG. 10. FIG. 2 is a side, sectional view of a section that has been cut along the lines 11—11 of FIG. 1. This optical scanning device is equipped with a rotary polygon mirror 10 having the shape of a regular polygon, for example, a hexagon. An air current rectifying mechanism 20 has a surface that is arranged above the rotary polygon mirror 10, as illustrated. As shown in FIG. 2, the optical scanning device is supported by a housing body 31. Moreover, a housing lid (not illustrated in FIG. 1) is attached to the housing body 31. Thus, the housing is formed by the housing body 31 and the housing lid.

The rotary polygon mirror 10 has plural, planar reflecting surfaces (hereinafter referred to simply as 'reflecting planes') 10a, with edges 10b being formed by the intersections between the adjacent reflecting planes 10a. The rotary polygon mirror 10 is coaxially positioned on a disk-like rotor 12 that is rotated by a motor 11 and is integrally fixed to the rotor by pushing it with a pushing member 13 that is arranged at the center of the top surface of the rotary polygon mirror. The motor 11 is positioned within a recess 31a formed in the housing body 31, and is affixed to a motor support plate 14 that is supported by the housing body 31.

The air current rectifying mechanism 20, in this embodiment takes a shape as illustrated in FIG. 2, and is sized so that the air current rectifying mechanism has a larger diameter than that of a circle that circumscribes the rotary polygon mirror 10. Thus, the air current rectifying mechanism 20 has a surface area that is greater than the surface area of circle that circumscribes the rotary polygon mirror 10. Plural (three, in this embodiment) feet 21 are formed at equal spacings about the periphery of the air current rectifying mechanism 20, the feet 21 being fixed to the housing body 31 by means of screws, etc. In the fixed state, the air current rectifying mechanism 20 is positioned coaxially to, and with a surface that is parallel to the top end surface of the rotary polygon mirror 10 such that a slight gap L2 is formed between the air current rectifying mechanism and the rotary polygon mirror 10. A light beam is made to be incident upon the reflecting planes 10a of the rotary polygon mirror 10 by using a space between the feet 21. A through-hole 20a that serves as an escape region for the above pushing member 13 is formed at the center of the air current rectifying mechanism 20. The air current rectifying mechanism 20 is made to be as close to the rotary polygon mirror 10 as possible. For example, if the thickness L1 of the rotary polygon mirror 10 is approximately 2 mm, the gap L2 between the rotary polygon mirror 10 and the air current rectifying mechanism 20 must be made less than 2 mm. As mentioned above, it is desirable, that the gap in this instance be half this amount. Next, the operation of the embodiment will be described.

As shown in FIG. 3, for a rotation direction R, air currents shown by arrow A, are generated around the rotary polygon mirror 10. Because the air current rectifying mechanism is located very near the rotary polygon mirror, the negative pressure and associated eddy currents $A_2$ as formed within the region W as shown in FIG. 11(a) for the prior art do not form. The air current rectifying mechanism reflects air that slips off the top edge of the reflecting plane 10a as indicated, which creates the air currents $A_3$ that suppress the occurrence of negative pressure regions downstream from each edge 10b. In this manner, the adherence of dust to the reflecting plane 10a is minimized. Thus, the reflectivity of the scanning mirror surfaces is maintained and the quality of the output image is stabilized.

Embodiment 2

Figure 4:
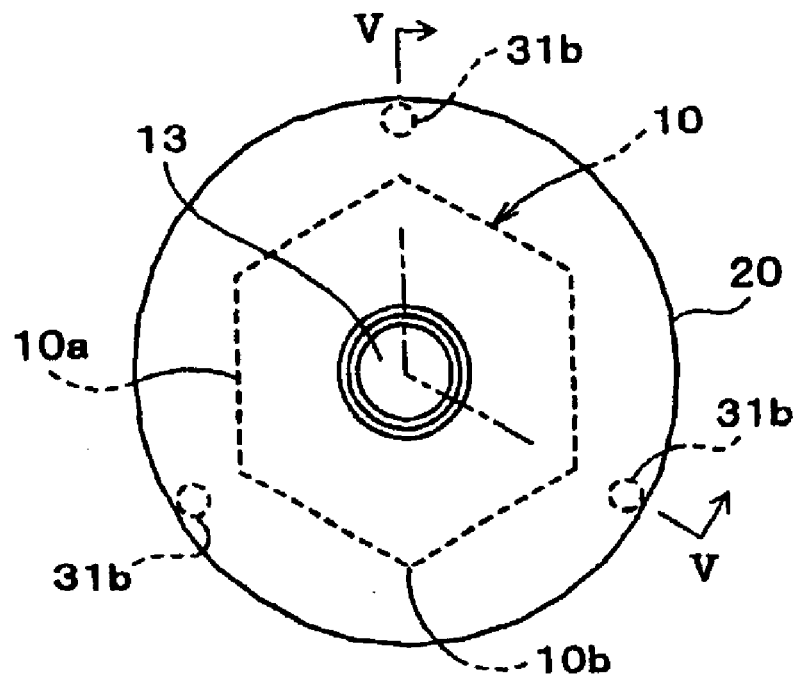
FIG. 4 is a plan view of an optical scanning device with an air current rectifying mechanism according to Embodiment 2.
Figure 5:
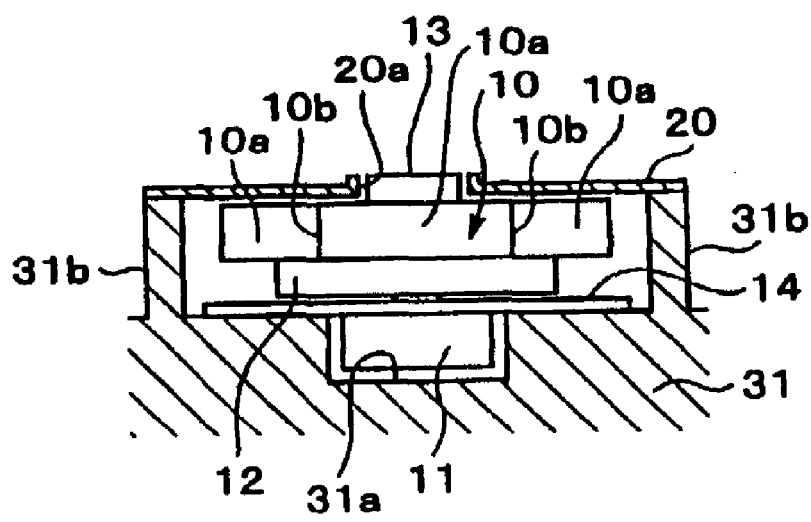
FIG. 5 is a side, sectional view of a section that has been cut along the lines V—V of FIG. 4.

FIG. 4 is a plan view of an optical scanning device according to Embodiment 2 of the present invention, and FIG. 5 is a side, sectional view of a section that has been cut along the lines V—V of FIG. 4. In this embodiment, like items are labeled with the same symbol as in Embodiment 1 and will not be further discussed. In this embodiment, plural bosses 31b are integrally formed with the housing body 31, and the air current rectifying mechanism 20 is fixed to the bosses by means of adhesive or screws, etc. In other respects, the operation of this embodiment in avoiding dust from being deposited and adhering to the scanning mirror planar surfaces is that same as described above for Embodiment 1.

Embodiment 3

Figure 6:
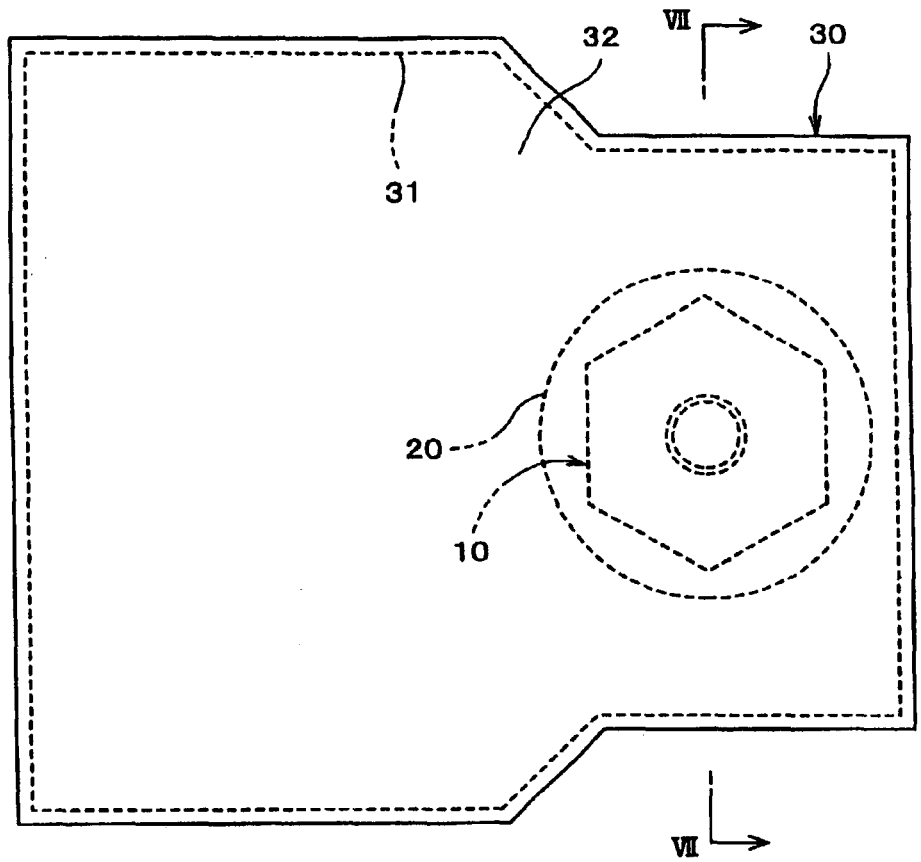
FIG. 6 is a plan view of an optical scanning device with an air current rectifying mechanism according to Embodiment 3.
Figure 7:
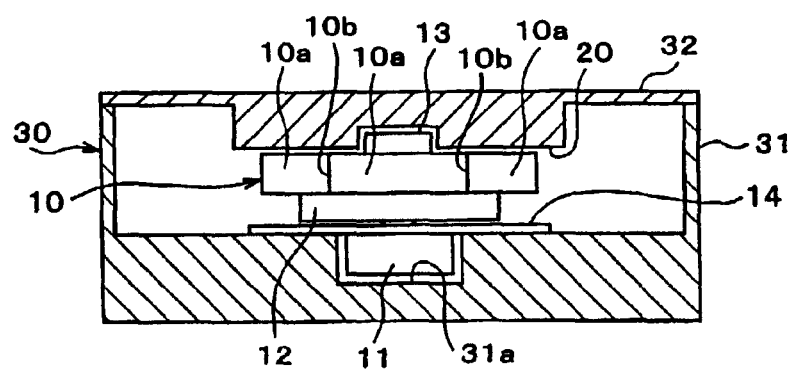
FIG. 7 is a side, sectional view of a section that has been cut along lines VII—VII of FIG. 6.

FIG. 6 is a plan view of an optical scanning device according to Embodiment 3 of the present invention, and FIG. 7 is a side, sectional view of a section that has been cut along lines VII—VII of FIG. 6. In this embodiment, like items are labeled with the same symbol as in Embodiment 1 and will not be further discussed. In this embodiment, the air current rectifying mechanism 20 is integrally formed with the housing lid 32. The air current rectifying mechanism 20 of this embodiment may be molded so that the lid areas opposite to the rotary polygon mirror 10 are extended downward so that they are very near the rotary polygon mirror.

According to Embodiment 3, the air current rectifying mechanism 20 need not be prepared as a separate part and therefore a reduction in the total number of parts and simplification of construction is achieved.

Embodiment 4

Figure 8:
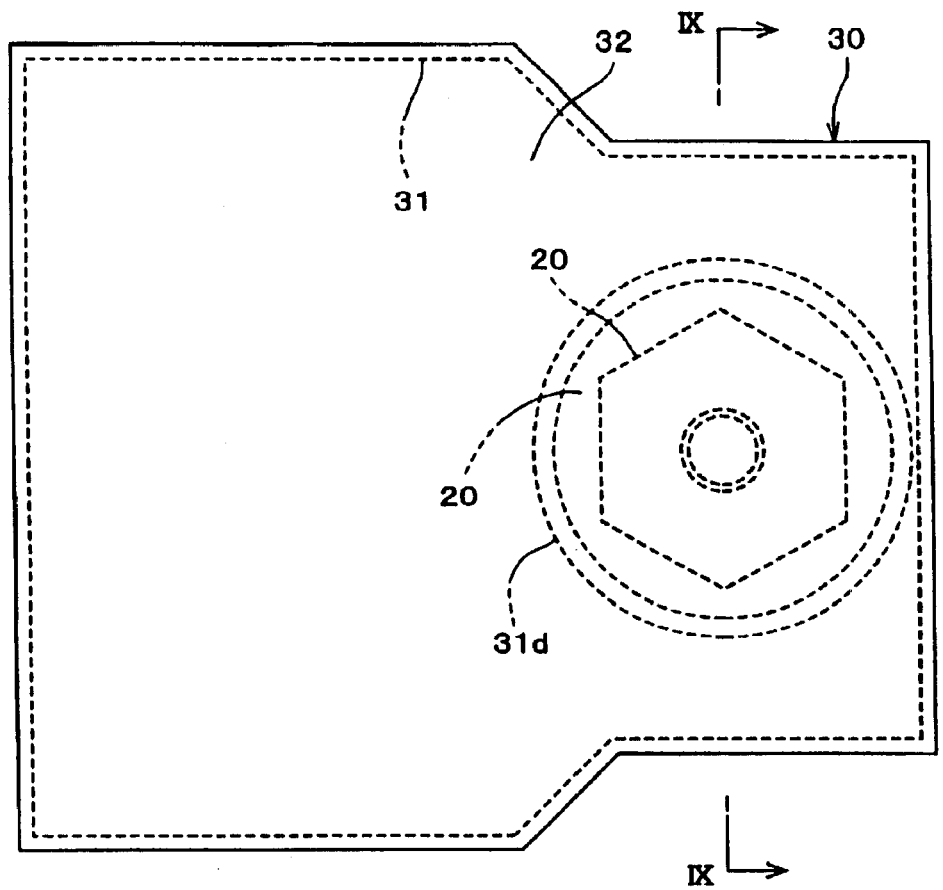
FIG. 8 is a plan view of an optical scanning device with air current rectifying mechanism according to Embodiment 4.
Figure 9:
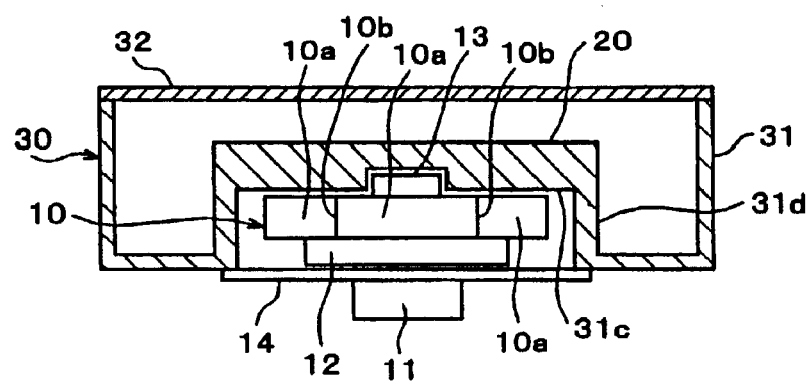
FIG. 9 is a side, sectional view of a section that has been cut along lines IX—IX of FIG. 8.

FIG. 8 is a plan view of an optical scanning device according to Embodiment 4 of the present invention, and FIG. 9 is a side, sectional view of a section that has been cut along lines IX—IX of FIG. 8. In this embodiment, like items are labeled with the same symbol as in Embodiment 1 and will not be further discussed. In this embodiment, the rotary polygon mirror 10 is received in a recess 31c that is formed on the reverse side of the housing body 31, and a motor support plate 14 is fixed to the reverse side of housing body 31. As shown in FIG. 9, the recess 31c is formed by a cylindrical side wall 31d that is integral with the housing body 31 and the air current rectifying mechanism 20, is made integral with the housing body 31 and cylindrical side wall 31d. In this case, a light beam is made to be incident upon the reflecting planes 10a using a notch (not illustrated) that is formed in the cylindrical side wall 31d. According to this embodiment, the air current rectifying mechanism 20 does not need to be prepared as a separate part and therefore a further reduction in the total number of parts and simplification of the construction is achieved. Once again, the operation of this embodiment is similar to that as described previously for the earlier embodiments.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An optical scanning device, comprising:

rotary polygon mirror which is used to scan a light beam; and an air current rectifying mechanism that is positioned near at least one end surface of the rotary polygon mirror, is oriented so as to be substantially parallel to said at least one end surface of the rotary polygon mirror and is not rotated when the optical scanning device is used to scan a light beam; wherein the following Condition (1) is satisfied:

$$L1 > L2 \qquad \text{Condition (1)}$$

where

L1 is the thickness of the rotary polygon mirror as measured in the axial direction, and L2 is the spacing, as measured in the direction of the axis of rotation of the rotary polygon mirror, between said at least one end surface of the rotary polygon mirror and an adjacent surface of the air current rectifying mechanism.

2. The optical scanning device as set forth in claim 1, wherein the following Condition (2) is also satisfied:

$$L1/2 > L2 \qquad \text{Condition (2)}$$

3. The optical scanning device as set forth in claim 2, wherein the air current rectifying mechanism has a surface area that is greater than a circle that circumscribes the rotary polygon mirror.

4. The optical scanning device as set forth in claim 2, wherein the air current rectifying mechanism is made integral with a housing lid.

5. The optical scanning device as set forth in claim 2, wherein the air current rectifying mechanism is made integral with a housing body.

6. The optical scanning device as set forth in claim 1, wherein the air current rectifying mechanism has a surface area that is greater than a circle that circumscribes the rotary polygon mirror.

7. The optical scanning device as set forth in claim 6, wherein the air current rectifying mechanism is made integral with a housing lid.

8. The optical scanning device as set forth in claim 6, wherein the air current rectifying mechanism is made integral with a housing body.

9. The optical scanning device as set forth in claim 1, wherein the air current rectifying mechanism is made integral with a housing lid.

10. The optical scanning device as set forth in claim 1, wherein the air current rectifying mechanism is made integral with a housing body.

* * * * *

UNITED STATES PATENT AND TRADEMARK OFFICE
CERTIFICATE OF CORRECTION

PATENT NO. : 6,903,858 B2  
DATED : June 7, 2005  
INVENTOR(S) : Kaneko et al.

It is certified that error appears in the above-identified patent and that said Letters Patent is hereby corrected as shown below:

Column 1,  
Line 17, change "arrow A," to -- arrow $A_1$ --;

Column 2,  
Line 22, change "lines 11-11" to -- lines II-II --;

Column 3,  
Line 53, change "lines 11-11" to -- lines II-II --; and

Column 4,  
Line 36, change "arrow A," to -- arrow $A_1$ --.

Signed and Sealed this

Thirteenth Day of September, 2005

JON W. DUDAS  
*Director of the United States Patent and Trademark Office*